(12) United States Patent
Di Meco et al.

(10) Patent No.: US 12,331,197 B2
(45) Date of Patent: Jun. 17, 2025

(54) POWER TRANSMISSION BELT

(71) Applicant: DAYCO EUROPE S.R.L., Chieti (IT)

(72) Inventors: Marco Di Meco, Chieti (IT); Fabio Nardone, Chieti (IT); Domenico Parziale, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 0 days.

(21) Appl. No.: 18/563,445

(22) PCT Filed: May 23, 2022

(86) PCT No.: PCT/IB2022/054799
§ 371 (c)(1),
(2) Date: Nov. 22, 2023

(87) PCT Pub. No.: WO2022/249027
PCT Pub. Date: Dec. 1, 2022

(65) Prior Publication Data
US 2024/0287292 A1    Aug. 29, 2024

(30) Foreign Application Priority Data
May 24, 2021   (IT) ................. 102021000013373

(51) Int. Cl.
*C08L 9/02* (2006.01)
*F16G 1/28* (2006.01)

(52) U.S. Cl.
CPC .............. *C08L 9/02* (2013.01); *F16G 1/28* (2013.01); *C08L 2312/02* (2013.01)

(58) Field of Classification Search
CPC ..... F16G 1/28; F16G 1/00; C08L 9/02; C08L 9/00; C08L 2312/02

USPC ........................................................ 474/205
See application file for complete search history.

(56) References Cited

U.S. PATENT DOCUMENTS

| 5,387,160 | A | * | 2/1995 | Nakajima | ................ | C08K 5/39 |
| | | | | | | 474/271 |
| 5,405,299 | A | * | 4/1995 | Kubo | ...................... | F16H 7/023 |
| | | | | | | 474/205 |
| 5,756,586 | A | * | 5/1998 | Nishimura | ............... | C08K 5/00 |
| | | | | | | 525/263 |

(Continued)

FOREIGN PATENT DOCUMENTS

EP    3816221 A1    5/2021

OTHER PUBLICATIONS

International Search Report and Written Opinion, Application No. PCT/IB2022/054799, Aug. 16, 2022, p. 1-12.

*Primary Examiner* — Henry Y Liu
(74) *Attorney, Agent, or Firm* — FisherBroyles, LLP; Susan M. Oiler

(57) ABSTRACT

Power transmission belts described herein have a nitrile group-containing copolymer rubber that has an acrylonitrile unit, a monomer unit of α,β-ethylenically unsaturated nitrile monomer other than acrylonitrile, and a conjugated diene monomer unit. The nitrile group-containing copolymer rubber has an iodine value of 120 or less a total of the acrylonitrile unit and the monomer unit of α,β-ethylenically unsaturated nitrile monomer other than acrylonitrile is 1 to 50% by weight in the total monomer unit, and a weight ratio of the acrylonitrile unit and the monomer unit of α,β-ethylenically unsaturated nitrile monomer other than acrylonitrile is 10:90 to 90:10.

20 Claims, 2 Drawing Sheets

(56) References Cited

U.S. PATENT DOCUMENTS

| | | | | |
|---|---|---|---|---|
| 6,352,488 B1* | 3/2002 | Morris | F16G 1/28 | 474/263 |
| 8,475,309 B2* | 7/2013 | Di Meco | B32B 25/10 | 474/205 |
| 8,859,081 B2* | 10/2014 | Baldovino | B32B 25/10 | 524/565 |
| 8,962,129 B2* | 2/2015 | Tai | F16G 5/20 | 428/296.4 |
| 9,096,740 B2* | 8/2015 | Baldovino | C08L 9/00 | |
| 9,243,683 B2* | 1/2016 | Tomobuchi | F16G 1/10 | |
| 9,255,201 B2* | 2/2016 | Feng | F16G 5/06 | |
| 9,322,455 B2* | 4/2016 | Di Meco | F16G 1/28 | |
| 9,366,314 B2* | 6/2016 | Motozaki | D03D 15/47 | |
| 9,581,219 B2* | 2/2017 | Gaska | F16G 1/10 | |
| 9,927,001 B2* | 3/2018 | Di Meco | F16H 57/0489 | |
| 9,944,763 B2* | 4/2018 | Duke, Jr. | D06M 15/572 | |
| 10,006,519 B2* | 6/2018 | Ideguchi | F16G 1/04 | |
| 10,012,291 B2* | 7/2018 | Speer | F16G 1/28 | |
| 10,018,247 B2* | 7/2018 | Wu | D03D 15/47 | |
| 10,041,194 B2* | 8/2018 | Furusawa | F16G 5/06 | |
| 10,220,545 B2* | 3/2019 | Lofgren | B29C 70/20 | |
| 10,359,095 B2* | 7/2019 | Yoshida | B32B 25/02 | |
| 10,508,711 B2* | 12/2019 | Di Meco | F16G 1/28 | |
| 10,626,546 B2* | 4/2020 | Knox | D01F 11/16 | |
| 10,752,717 B2* | 8/2020 | Shiono | C08F 22/10 | |
| 11,111,342 B2* | 9/2021 | Duke, Jr. | F16G 1/28 | |
| 11,168,760 B2* | 11/2021 | Furusawa | D06M 15/693 | |
| 11,480,231 B2* | 10/2022 | Parziale | F16H 57/0489 | |
| 11,548,990 B2* | 1/2023 | Wu | D06M 15/564 | |
| 2002/0015825 A1* | 2/2002 | Meco | F16G 1/28 | 428/421 |
| 2006/0063627 A1* | 3/2006 | Tomobuchi | F16G 1/28 | 474/260 |
| 2008/0132370 A1* | 6/2008 | Goettsch | F16G 1/28 | 474/268 |
| 2008/0139709 A1* | 6/2008 | Piccirilli | F16G 1/28 | 524/106 |
| 2008/0166576 A1* | 7/2008 | Akiyama | B32B 25/14 | 428/500 |
| 2008/0286529 A1* | 11/2008 | Sueto | F16G 5/08 | 428/167 |
| 2009/0156341 A1* | 6/2009 | Gaynor | F16H 55/171 | 474/153 |
| 2009/0191998 A1* | 7/2009 | Di Meco | F16G 1/28 | 474/153 |
| 2009/0197726 A1* | 8/2009 | Obora | F16G 1/28 | 442/191 |
| 2009/0199347 A1* | 8/2009 | Wood | B29B 15/105 | 8/115.6 |
| 2010/0004082 A1* | 1/2010 | Di Meco | F16G 1/28 | 474/205 |
| 2010/0209148 A1* | 8/2010 | Hiramoto | G03G 15/6585 | 399/297 |
| 2010/0221520 A1* | 9/2010 | Tai | D06M 11/77 | 428/296.4 |
| 2010/0255259 A1* | 10/2010 | Baldovino | B32B 3/30 | 524/565 |
| 2010/0304909 A1* | 12/2010 | Baldovino | F16G 1/28 | 474/202 |
| 2011/0003659 A1* | 1/2011 | Wu | D03D 15/283 | 474/268 |
| 2011/0111902 A1* | 5/2011 | Well | C08L 15/005 | 474/204 |
| 2011/0129647 A1* | 6/2011 | Duke, Jr. | D06M 15/568 | 428/296.4 |
| 2011/0237374 A1* | 9/2011 | Nakao | F16G 1/08 | 474/205 |
| 2011/0263367 A1* | 10/2011 | Baldovino | F16G 1/28 | 474/204 |
| 2012/0142471 A1* | 6/2012 | Gaska | F16G 1/28 | 427/389.9 |
| 2012/0149510 A1* | 6/2012 | Baldovino | C08L 23/16 | 474/204 |
| 2012/0157251 A1* | 6/2012 | Di Meco | F16G 1/28 | 156/137 |
| 2012/0192822 A1* | 8/2012 | Rolando | F16G 1/28 | 123/90.31 |
| 2013/0059690 A1* | 3/2013 | Di Cesare | F16G 1/28 | 474/205 |
| 2013/0150488 A1* | 6/2013 | Feng | F16G 5/06 | 524/9 |
| 2013/0337956 A1* | 12/2013 | Motozaki | D03D 1/0094 | 474/205 |
| 2014/0093729 A1* | 4/2014 | Furusawa | D02G 3/447 | 523/205 |
| 2014/0206487 A1* | 7/2014 | Tomobuchi | C08J 5/046 | 474/205 |
| 2015/0005123 A1* | 1/2015 | Di Meco | F16G 9/04 | 474/205 |
| 2015/0111677 A1* | 4/2015 | Nishiyama | F16G 5/08 | 474/264 |
| 2015/0152590 A1* | 6/2015 | Knox | C08K 9/04 | 524/556 |
| 2015/0218357 A1* | 8/2015 | Feng | F16G 1/28 | 524/34 |
| 2016/0208889 A1* | 7/2016 | Yoshida | B32B 5/02 | |
| 2016/0377149 A1* | 12/2016 | Furusawa | F16G 1/10 | 474/205 |
| 2017/0023098 A1* | 1/2017 | Burlett | F16G 5/20 | |
| 2017/0023100 A1* | 1/2017 | Di Meco | F16G 1/28 | |
| 2017/0029578 A1* | 2/2017 | Wu | D06M 15/564 | |
| 2017/0051810 A1* | 2/2017 | Ideguchi | F16G 1/08 | |
| 2017/0082174 A1* | 3/2017 | Parziale | F16H 57/0489 | |
| 2017/0299017 A1* | 10/2017 | Gregg | F16G 1/04 | |
| 2017/0312939 A1* | 11/2017 | Lofgren | C08J 5/042 | |
| 2018/0023663 A1* | 1/2018 | Speer | F16G 5/20 | 474/261 |
| 2018/0051772 A1* | 2/2018 | Gregg | B29C 45/1642 | |
| 2018/0127530 A1* | 5/2018 | Shiono | C08F 236/04 | |
| 2018/0223056 A1* | 8/2018 | Duke, Jr. | D06M 15/568 | |
| 2019/0011016 A1* | 1/2019 | Yoshida | C08L 23/08 | |
| 2019/0315898 A1* | 10/2019 | Casagrande | C08K 7/14 | |
| 2019/0376579 A1* | 12/2019 | Wu | D03D 1/0094 | |
| 2020/0009813 A1* | 1/2020 | Tamura | B32B 5/26 | |
| 2020/0123333 A1* | 4/2020 | Yamaguchi | D07B 1/162 | |
| 2020/0187420 A1* | 6/2020 | Wood | F16G 3/06 | |
| 2020/0200232 A1* | 6/2020 | Ozaki | F16G 1/28 | |
| 2020/0208344 A1* | 7/2020 | Katagiri | C03C 25/25 | |
| 2020/0240488 A1* | 7/2020 | Meki | B32B 25/14 | |
| 2020/0362940 A1* | 11/2020 | Kagi | C08L 15/005 | |
| 2020/0378470 A1* | 12/2020 | Parziale | F16H 7/023 | |

* cited by examiner

FIG. 2

Table 1

| | | Example | | | | | | | | Comparative Example | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Monomer used for polymerization | | | | | | | | | | | | | | |
| Methacrylnitrile | (Parts) | 7 | 14 | 21 | 16 | 18 | 12 | 23 | 18 | 28 | 0 | 26.6 | 1.4 | 0 |
| Acrylonitrile | (Parts) | 21 | 14 | 7 | 16 | 18 | 23 | 12 | 18 | 0 | 28 | 1.4 | 26.6 | 36 |
| 2-methoxyethyl acrylate | (Parts) | 30 | 30 | 30 | 15 | 0 | 0 | 0 | 0 | 30 | 30 | 30 | 30 | 0 |
| 1,3-butadiene | (Parts) | 40 | 40 | 40 | 51.5 | 62.5 | 63.5 | 63.5 | 64 | 40 | 40 | 40 | 40 | 64 |
| Methacrylic acid | (Parts) | 2 | 2 | 2 | 1.5 | 1.5 | 1.5 | 1.5 | 0 | 2 | 2 | 2 | 2 | 0 |
| Monomer composition of nitrile group-containing copolymer rubber | | | | | | | | | | | | | | |
| Methacrylnitrile unit | (wt%) | 8 | 15 | 22.5 | 18 | 19 | 13 | 24 | 20 | 30 | 0 | 28 | 1.7 | 0 |
| Acrylonitrile unit | (wt%) | 21 | 14 | 7 | 17 | 18 | 23 | 12 | 18 | 0 | 29 | 1.5 | 27.8 | 36 |
| 2-methoxyethyl acrylate unit | (wt%) | 22 | 22 | 22 | 13 | 0 | 0 | 0 | 0 | 22 | 22 | 22.5 | 22.5 | 0 |
| 1,3-butadiene unit (including hydrogenated moieties) | (wt%) | 46.9 | 46.9 | 46.4 | 50.4 | 61.4 | 62.4 | 62.4 | 62 | 45.9 | 46.9 | 45.9 | 46.9 | 64 |
| Methacrylic acid unit | (wt%) | 2.1 | 2.1 | 2.1 | 1.6 | 1.6 | 1.6 | 1.6 | 0 | 2.1 | 2.1 | 2.1 | 2.1 | 0 |
| Iodine value of nitrile group-containing copolymer rubber | | 8 | 8 | 8 | 8 | 8 | 8 | 8 | 8 | 8 | 8 | 8 | 8 | 8 |
| Mooney viscosity of nitrile group-containing copolymer rubber | | 60 | 50 | 40 | 60 | 65 | 70 | 70 | 70 | 50 | 50 | 50 | 50 | 80 |
| Normal physical properties | | | | | | | | | | | | | | |
| Tensile strength | (MPa) | 15 | 15 | 12.8 | 16.5 | 20.8 | 18.9 | 20.6 | 23.2 | 9.5 | 16 | 10.3 | 17.2 | 22.9 |
| Elongation | (%) | 340 | 390 | 380 | 340 | 340 | 360 | 350 | 350 | 370 | 340 | 370 | 330 | 340 |
| Hardness | | 66 | 65 | 64 | 66 | 68 | 67 | 67 | 69 | 62 | 66 | 62 | 66 | 70 |
| Heat resistance test (150°C, 504 hours) | | | | | | | | | | | | | | |
| Change rate in tensile strength | (%) | -7 | -15 | -2 | -6 | -2 | -3 | -6 | -4 | 21 | -9 | 20 | -10 | -3 |
| Elongation after heat resistance test | (%) | 150 | 160 | 180 | 190 | 230 | 220 | 230 | 220 | 190 | 160 | 200 | 170 | 240 |
| Oil resistance test (IRM903) | | | | | | | | | | | | | | |
| Volume change rate | (%) | 9 | 12 | 14 | 15 | 17 | 13 | 16 | 17 | 19 | 7 | 19 | 7 | 7 |
| Elongation after oil resistance test | (%) | 240 | 260 | 240 | 270 | 270 | 270 | 250 | 270 | 230 | 240 | 230 | 220 | 240 |
| Fuel oil resistance test | | | | | | | | | | | | | | |
| Change rate in tensile strength | (%) | 9 | 5 | 12 | 12 | 16 | 13 | 17 | 13 | 14 | 8 | 15 | 8 | 8 |
| Elongation after fuel oil resistance test | (%) | 230 | 260 | 300 | 300 | 310 | 290 | 300 | 270 | 320 | 240 | 300 | 250 | 280 |
| Test of resistance to hardening in oil under heating environment (using polycyclic condensed aromatic compound) | | | | | | | | | | | | | | |
| Change rate in glass transition temperature | (°C) | 7.4 | 4.7 | 3.4 | 6.7 | 3.1 | 5.5 | 2.2 | 3.1 | 0.8 | 11.2 | 1.2 | 11.2 | 12.0 |
| Change in hardness | | 1.8 | 0.4 | 1.3 | -2.2 | -2.3 | 1.2 | 0.6 | -1.8 | 3.0 | 20.0 | 1.8 | 20.0 | 22.0 |

POWER TRANSMISSION BELT

CROSS-REFERENCE TO RELATED APPLICATIONS

The present invention is filed under 35 U.S.C. § 371 as the U.S. National Phase of International Patent Application No. PCT/IB2022/054799, filed May 23, 2022, which designated the United States and which claims the benefit of Italian Patent Application No. 102021000013373, filed on May 24, 2021, the entire disclosure of which is incorporated herein by reference.

TECHNICAL FIELD OF THE INVENTION

This invention relates to a power transmission belt comprising a nitrile group-containing copolymer rubber.

STATE OF THE ART

Power transmission belts generally comprise a body made of an elastomeric material, in which a plurality of longitudinal thread-like durable inserts, also known as "cords" are embedded and covered by a covering fabric.

Each component of the power transmission belt contributes to increasing the performance in terms of mechanical resistance, in order to decrease the risk of failure of the power transmission belt, e.g. breaking, and to increase the specific transmissible power.

In particular, the cords contribute to ensuring the required mechanical characteristics of the power transmission belt and make an essential contribution to determining the modulus of the power transmission belt and, in particular, ensure time. The cords are generally stable performance over obtained by winding high-modulus fibres several times.

The cords are normally treated with suitable material to increase the compatibility of the fibres with the body compound that surrounds the cords. The body compound enables connecting the various abovementioned elements and ensures that they contribute to the final performance of the power transmission belt in a synergetic manner.

Body compounds are based on one or more elastomeric materials, preferably enriched with fibres to increase hardness.

The covering fabric of the power transmission belts has the task of increasing abrasion resistance and thus protects the working surface of the power transmission belt from wear due to rubbing between the teeth of the power transmission belt and the pulley with which the power transmission belt interacts. The fabric is normally treated with an adhesive, for example RFL (resorcinol and formaldehyde lattice) to increase the adherence between the body compound and the fabric itself.

In addition, the covering fabric can be fitted to reduce the coefficient of friction of the working surface, reduces the deformability of the teeth and, most of all, reinforces the landing zone, thereby avoiding its breakage.

Finally, the body compound allows connecting the various above said elements and ensuring that the various elements forming the power transmission belt itself synergically contribute to the final performance of the power transmission belt itself.

The body compounds typically contain one or more elastomeric materials possibly enriched with fibres to increase the hardness thereof, as for example U.S. Pat. No. 2,699,685 A.

However, in recent engines where performance has increased significantly, power transmission belts, are subjected to high temperatures and these temperatures result in quicker deterioration of the materials forming the various components of the power transmission belts and the power transmission belts must have better mechanical characteristics in order to have a longer mean lifetime.

Typically timing belts are used "dry". By "dry" use, it is intended that the power transmission belts are external to the engine block, are only accidentally in contact with engine oil and are generally not in contact with oil mixed with fuel or other oil pollutants.

Engines have been recently developed for motor vehicles comprising a timing transmission system in which the chains have been replaced by power transmission belts in the same working environment and therefore in continuous contact with oil or in an oil mist.

Systems of this type have been illustrated in patents by the applicant, as in WO2005/080820 for example. In these transmission systems, the power transmission belt is known as an "oil bath belt" or "wet belt" and must be able to satisfy the same longevity requirements of the equivalent chain transmission systems. Within the scope of the present invention, an "oil-bath belt" or "wet belt" is understood to be a power transmission belt used in transmission systems in which it is at least partially immersed in oil at rest and/or during operation, or in transmission systems in which the power transmission belt is continuously in contact with oil or in an oil mist, for example, systems in which oil is supplied to the power transmission belt, for example as a spray via a specially provided nozzle or by shaking due to the action of the power transmission belt and the pulleys.

In particular, in these transmission systems there are no means of separation between the oil lubricating the engine and the transmission system.

Power Transmission belts in oil must therefore resist in continuous contact with high temperature oil during engine operation and not sustain damage, neither at high operating temperatures, nor at very low temperatures.

In particular, it is therefore fundamental for the body compound, which must resist in oil even at high temperatures, to avoid or at least reduce absorption of the oil as well as to maintain a good resistance to abrasion.

Furthermore, in systems in which the power transmission belt is used in direct contact or partially immersed in oil, the engine oil is often contaminated by fuel. In particular, the contamination with fuel that mixes with oil even in high percentages thus diluting the oil itself and attacking the materials forming the power transmission belt, is important for the volume swell of the power transmission belt.

For instance, in some applications oil is mixed and may even comprise up to 30% fuel. The percentage of fuel varies according to the operative conditions of the engine and is higher with a high load and low temperature of the engine.

As is known, fuel also contains many additives which may damage the compounds by which power transmission belts are generally manufactured.

With respect to chain transmissions, belt transmissions generally have lower friction losses and are also less expensive. In addition, a belt transmission is quieter and the stretching of the belt is at most a quarter of that of a chain: this enables controlling the valves of the internal combustion engine much more precisely and also leads to fuel savings.

In general, the basic problem of transmission systems in which the power transmission belt substitutes a chain is to make a power transmission belt that can last at least 240,000 km or 150,000 miles, or rather to ensure that, under normal operating conditions, the power transmission belt never needs to be changed for the entire working life of the vehicle.

To this end, the power transmission belts must have better combination of oil swell and low-temperature characteristics than those currently on the market.

Transmission systems in which the power transmission belt is wet with oil and/or works continuously in oil are generally very similar to those where a chain is used for motion transmission.

Materials suitable for the use in the body of power transmission belts, e.g. hydrogenated nitrile rubber (HNBR) or HNBR-terpolymers are well known.

For example, EP-A-2 868 677 discloses a nitrile-group comprising copolymer with 1 to 9 wt.-% monocarboxylic acid monomer units with a Tg of less than −20° C. and an oil swell of less than 20%. The terpolymers comprise 4.8 wt.-% and 7.7 wt.-% methoxyethyl acrylate, e.g. PEG-1-acrylate or 4.1 wt.-% PEG-5-methacrylate.

EP-A-2 868 676 discloses a nitrile-group-comprising copolymer with 1 to 9 wt. % α,β-ethylenically unsaturated monomers. Hydrogenated 10 carboxylic-group-comprising terpolymers with PEG-11-monomers are explicitly disclosed.

However, this solution is disadvantageous as the combination of oil swell and low-temperature characteristics are still not satisfactory for high performance power transmission.

A major further disadvantage of the known power transmission belts it that very good flexibility and oil swelling resistance cannot be adjusted independently of one another. Therefore, the known HNBR polymers are still unsatisfactory for belt running in contact with oil and particularly at low temperatures.

SUBJECT AND SUMMARY OF THE INVENTION

A first object of the present invention is to obtain a power transmission belt, in particular a toothed power transmission belt, with superior characteristics, which is resistant to high temperatures when continually used in contact with oil or even partially immersed in oil, and which, at the same time, is easily manufactured and inexpensive.

A further object of the present invention is to obtain a power transmission belt, in particular a toothed power transmission belt, which has a long service life and which therefore has excellent characteristics regarding high temperature resistance, oil swell and low-temperature characteristics.

In accordance with the present invention, these objects are achieved by a power transmission belt that has a nitrile group-containing copolymer rubber that has an acrylonitrile unit, a monomer unit of α,β-ethylenically unsaturated nitrile monomer other than acrylonitrile, and a conjugated diene monomer unit. The nitrile group-containing copolymer rubber has an iodine value of 120 or less a total of the acrylonitrile unit and the monomer unit of α,β-ethylenically unsaturated nitrile monomer other than acrylonitrile is 1 to 50% by weight in the total monomer unit, and a weight ratio of the acrylonitrile unit and the monomer unit of α,β-ethylenically unsaturated nitrile monomer other than acrylonitrile is 10:90 to 90:10. In another aspect, methods of making such a power transmission belt are disclosed herein.

BRIEF DESCRIPTION OF THE DRAWINGS

For a better understanding of the present invention, it will now be described with reference to the attached figures, in which:

FIG. 2 is a table numbered 1 and reporting the results from tests of the examples and comparative examples.

DETAILED DESCRIPTION OF PREFERRED EMBODIMENTS OF THE INVENTION

Figure 1:
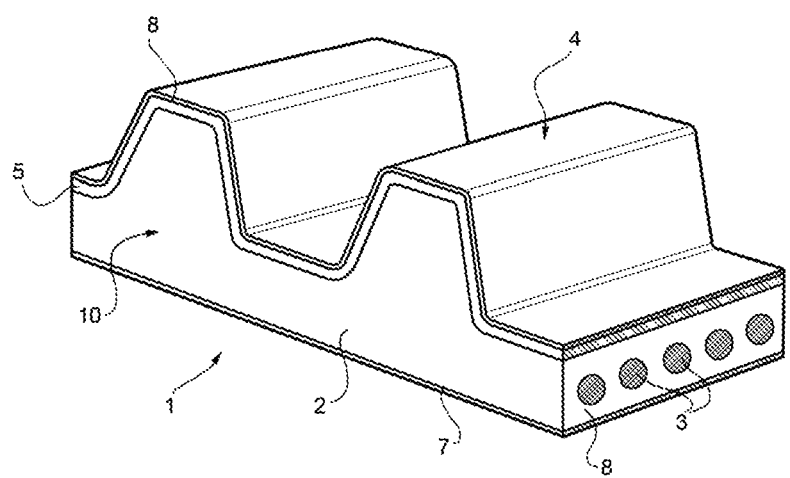
FIG. 1 is a side view of a portion of toothed power transmission belt according to the present invention

FIG. 1 shows a power transmission belt, indicated as a whole by reference numeral 1. The power transmission belt 1 comprises a body 2 made of elastomeric material comprising a hydrogenated nitrile-butadiene-PEG acrylate copolymer in which is a plurality of longitudinal filiform resistant inserts 3 are embedded. In a preferred alternative, the body 2 has a toothing 4, which is covered by a covering fabric 8. The power transmission belt also comprises a back 7 opposite to the working surface 5.

Hereinafter, by the expression power transmission belt is intended not only a toothed belt but also all kind of known power transmission belts V-belts, poly-V belts, as trapezoidal belts, flat belts.

Hereinafter, by the expression "the elastomeric material is basically constituted" it is meant that the elastomeric material can comprise small percentages of other polymers or copolymers, which can be added to the elastomeric material without varying the chemical-physical characteristics of the mixture and hence without departing from the scope of the present invention.

Hereinafter, it is understood that "additive for elastomeric material" means some kind of material that is added to the elastomeric material to change its chemical and physical characteristics.

Use "in oil" or "in an oil mist" means that the power transmission belt is used partially immersed in an oil bath or is in direct contact with oil, generally the power transmission belt in use is within the engine block, for instance as a replacement of chain or gear systems.

Use "in dry conditions" means that the power transmission belts are outside the engine block and are only accidentally in contact with the engine oil and are not generally in contact with fuel-mixed oil.

Use "in fuel-mixed oil" means that the power transmission belt is used in a mixture of oil with percentages even over 30%.

The power transmission belt comprises a rubber composition comprising a nitrile group-containing copolymer rubber comprising an acrylonitrile unit (a), a monomer unit (b) of α,β-ethylenically unsaturated nitrile monomer other than acrylonitrile, and a conjugated diene monomer unit (c) and having an iodine value of 120 or less, wherein
 a content of the total of the acrylonitrile unit (a) and the monomer unit (b) of α,β-ethylenically unsaturated nitrile monomer other than acrylonitrile is 1 to 50% by weight in the total monomer unit, and
 a content ratio of the acrylonitrile unit (a) and the monomer unit (b) of α,β-ethylenically unsaturated nitrile monomer other than acrylonitrile is 10:90 to 90:10 in a weight ratio of "content of acrylonitrile unit (a):content of monomer unit (b) of α,β-ethylenically unsaturated nitrile monomer other than acrylonitrile.

In the nitrile group-containing copolymer rubber of the present invention, it is preferable that an α,β-ethylenically unsaturated nitrile monomer other than acrylonitrile constituting the monomer unit (b) of α,β-ethylenically unsaturated nitrile monomer other than acrylonitrile has 2 to 5 carbon atoms as the carbon atom excluding the cyano group.

In the nitrile group-containing copolymer rubber of the present invention, it is preferable that the content of the total of the acrylonitrile unit (a) and the monomer unit (b) of α,β-ethylenically unsaturated nitrile monomer other than acrylonitrile is 10 to 45% by weight in the total monomer unit.

In the nitrile group-containing copolymer rubber of the present invention, it is preferable that the iodine value is 80 or less.

In the nitrile group-containing copolymer rubber of the present invention, it is preferable that the content ratio of the acrylonitrile unit (a) and the monomer unit (b) of α,β-ethylenically unsaturated nitrile monomer other than acrylonitrile is 20:80 to 80:20 in a weight ratio of "content of acrylonitrile unit (a):content of monomer unit (b) of α,β-ethylenically unsaturated nitrile monomer other than acrylonitrile".

In the nitrile group-containing copolymer rubber of the present invention, it is preferable that the content ratio of the acrylonitrile unit (a) and the monomer unit (b) of α,β-ethylenically unsaturated nitrile monomer other than acrylonitrile is 25:75 to 75:25 in a weight ratio of "content of acrylonitrile unit (a):content of monomer unit (b) of α,β-ethylenically unsaturated nitrile monomer other than acrylonitrile".

In the nitrile group-containing copolymer rubber of the present invention, it is preferable that a content of the conjugated diene monomer unit (c) is 10 to 90% by weight.

Preferably, the above rubber composition comprises the nitrile group-containing copolymer rubber blended with a cross-linking agent and in the belt the rubber composition is cross-linked.

It should be noted that the scope of the invention includes any and all possible combinations of the components, ranges of values and/or process parameters mentioned above and cited hereinafter, in general terms or within areas of preference. The term "nitrile-group containing copolymer rubber" in the context of this invention concerns a copolymer containing at least acrylonitrile units, α,β-ethylenically unsaturated nitrile monomer units other than acrylonitrile, conjugated diene monomer units of at least one kind.

The term copolymer encompasses polymers having more than one monomer unit. In one embodiment of the invention, the copolymer is preferably, for example, from the three monomer types (a), (b) and (c) described above, and is therefore a terpolymer. The term "copolymer" likewise encompasses, for example, additionally quaterpolymers, derived from the three monomer types (a), (b) and (c) described and a further monomer unit (d).

α,β-Ethylenically Unsaturated Nitrile

The α,β-ethylenically unsaturated nitrile used, which forms the α,β-ethylenically unsaturated nitrile units (a), may be any known α,β-ethylenically unsaturated nitrile. Preference is given to α,β-ethylenically unsaturated nitrile monomer having 2 to 5 carbon atoms as the carbon atom excluding the cyano group is preferable also indicated as (C2-C5)-α,β-ethylenically unsaturated nitriles such as haloacrylnitrile, for example α-chloroacrylnitrile and α-bromoacrylnitrile, α-alkylacrylonitrile, for example methacrylonitrile, ethacrylonitrile or mixtures of two or more α,β-ethylenically unsaturated nitriles. Particular preference is given to methacrylonitrile, ethacrylonitrile or mixtures thereof. Very particular preference is given to methacrylonitrile.

The amount of components a) acrylonitrile and b) α,β-ethylenically unsaturated nitrile units is typically in the range from 1 to 50%, based on the total amount of 100% by weight of all the monomer units, preferably 10 to 45 wt %, more preferably 15 to 42 wt %, still more preferably 20 to 40 wt %, particularly preferably 26 to 36 wt %.

When the content of the total of the acrylonitrile unit (a) and the monomer unit (b) of α,β-ethylenically unsaturated nitrile monomer other than acrylonitrile is too small, the obtained cross-linked rubber is liable to be inferior in oil resistance. By contrast, when the content thereof is too large, there is a possibility that the resistance to hardening in oil decreases.

Further, the content ratio of the acrylonitrile unit (a) and the monomer unit (b) of α,β-ethylenically unsaturated nitrile monomer other than acrylonitrile in the nitrile group-containing copolymer rubber of the present invention is, in terms of weight ratio of "content of acrylonitrile unit (a): content of monomer unit (b) of α,β-ethylenically unsaturated nitrile monomer other than acrylonitrile", 10:90 to 90:10, preferably 12:88 to 88:12, more preferably 15:85 to 85:15, still more preferably 20:80 to 80:20, furthermore preferably 25:75 to 75:25, particularly preferably 30:70 to 60:40. When the content of the acrylonitrile unit (a) is too small, the obtained cross-linked rubber results inferior in tensile strength and oil resistance. By contrast, when the content of the monomer unit (b) of α,β-ethylenically unsaturated nitrile monomer other than acrylonitrile is too small, the obtained cross-linked rubber results inferior in oil resistance and resistance to hardening in oil under heating environment.

The content of the acrylonitrile unit (a) in the nitrile group-containing copolymer rubber of the present invention may be in the above range in relation to the monomer unit (b) of α,β-ethylenically unsaturated nitrile monomer other than acrylonitrile, but is preferably 1 to 45 wt %, more preferably 5 to 40 wt %, still more preferably 10 to 37.5 wt %, particularly preferably 12 to 25 wt % based on the total monomer unit. In addition, the content of the monomer unit (b) of α,β-ethylenically unsaturated nitrile monomer other than acrylonitrile in the nitrile group-containing copolymer rubber of the present invention may be in the above range in relation to the acrylonitrile unit (a), but is preferably 1 to 45 wt %, more preferably 5 to 40 wt %, still more preferably 10 to 37.5 wt %, particularly preferably 12 to 25 wt % based on the total monomer unit. By setting the content of the acrylonitrile unit (a) and the content of the monomer unit (b) of α,β-ethylenically unsaturated nitrile monomer other than acrylonitrile within the above ranges, the obtained cross-linked rubber can be made more excellent in heat resistance, oil resistance, and resistance to hardening in oil under heating environment.

As the conjugated diene monomer constituting the conjugated diene monomer unit (c), conjugated diene monomers having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiene is particularly preferable. The conjugated diene monomers may be used as single types alone or as a plurality of types in combination.

In the nitrile group-containing copolymer rubber of the present invention, the content of the conjugated diene monomer unit (C) (including hydrogenated moieties) is preferably 10 to 90 wt %, more preferably from 20 to 80 wt %, and still more preferably from 30 to 70 wt %, particularly preferably 35 to 65 wt % based on the total monomer unit. By setting the content of the conjugated diene monomer unit within the above-mentioned range, a cross-linked rubber excellent in rubber elasticity can be obtained while keeping heat resistance and chemical stability good.

In certain embodiment in addition to the acrylonitrile unit (a), the monomer unit (b) of α,β-ethylenically unsaturated nitrile monomer other than acrylonitrile, and the conjugated diene monomer unit (c), it is preferable that the nitrile group-containing copolymer rubber according to the present invention further contains a carboxyl group-containing monomer unit (d). By further containing the carboxyl group-containing monomer unit (d), a carboxyl group can be introduced into the nitrile group-containing copolymer rubber of the present invention.

The carboxyl group-containing monomer constituting the carboxyl group-containing monomer unit (d) is not particularly limited so long as the monomer having one or more unsubstituted (free) carboxyl groups which are not esterified etc. Examples thereof include α,β-ethylenically unsaturated monocarboxylic acid monomer, α,β-ethylenically unsaturated polyvalent carboxylic acid monomer, and α,β-ethylenically unsaturated dicarboxylic acid monoester monomer, and the like. The carboxyl group-containing monomer also includes one having carboxyl group that form carboxylate. In addition, an anhydride of the α,β-ethylenically unsaturated polyvalent carboxylic acid can be used as the carboxyl group-containing monomer since their acid anhydride group is cleaved to form carboxyl groups after copolymerization.

Examples of the α,β-ethylenically unsaturated monocarboxylic acid monomer include acrylic acid, methacrylic acid, ethylacrylic acid, crotonic acid, cinnamic acid, and the like.

Examples of the α,β-ethylenically unsaturated polyvalent carboxylic acid monomer include butenedioic acids such as fumaric acid and maleic acid, itaconic acid, citraconic acid, mesaconic acid, glutaconic acid, allylmalonic acid, teraconic acid, and the like. Examples of the anhydride of the α,β-ethylenically unsaturated polyvalent carboxylic acid include maleic anhydride, itaconic anhydride, citraconic anhydride, and the like.

Examples of the α,β-ethylenically unsaturated dicarboxylic acid monoester monomer include maleic acid monoalkyl esters such as monomethyl maleate, monoethyl maleate, monopropyl maleate, and mono-n-butyl maleic acid maleate; monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl such esters as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

The carboxyl group-containing monomer may be used as single types alone or as a plurality of types in combination.

Among these, from the viewpoint of making the effects of the present invention further remarkable, the α,β-ethylenically unsaturated monocarboxylic acid monomer is preferable, acrylic acid, methacrylic acid are more preferable, methacrylic acid is particularly preferable.

The content of the carboxyl group-containing monomer unit (d) in the nitrile group-containing copolymer rubber according to the present invention is preferably 0.1 to 10 wt %, more preferably 0.5 to 8 wt %, and still more preferably 1 to 5 wt % based on the total monomer unit. By setting the content of the carboxyl group-containing monomer unit within the above-mentioned range, it is possible to make the mechanical properties of the obtained cross-linked rubber better.

Further, in addition to the acrylonitrile unit (a), the monomer unit (b) of α,β-ethylenically unsaturated nitrile monomer other than acrylonitrile, and the conjugated diene monomer unit (c), and the carboxyl group-containing monomer unit (d) which is contained accordance with need, the nitrile group-containing copolymer rubber according to the present invention may contain an α,β-ethylenically unsaturated monocarboxylic acid ester monomer (e).

The α,β-ethylenically unsaturated monocarboxylic acid ester monomer constituting the α,β-ethylenically unsaturated monocarboxylic acid ester monomer (e) is not particularly limited. Examples thereof include α,β-ethylenically unsaturated monocarboxylic acid alkyl ester monomers, α,β-ethylenically unsaturated monocarboxylic acid alkoxyalkyl ester monomers, α,β-ethylenically unsaturated monocarboxylic acid aminoalkyl ester monomers, α,β-ethylenically unsaturated monocarboxylic acid hydroxyalkyl ester monomers, and α,β-ethylenically unsaturated monocarboxylic acid fluoroalkyl ester monomers and the like.

Among these, α,β-ethylenically unsaturated monocarboxylic acid alkyl ester monomers and α,β-ethylenically unsaturated monocarboxylic acid alkoxyalkyl ester monomers are preferred, and α,β-ethylenically unsaturated monocarboxylic acid alkoxyalkyl ester monomers are more preferred.

By containing an α,β-ethylenically unsaturated monocarboxylic acid ester monomer unit, cold resistance of the obtained cross-linked rubber can be improved.

The α,β-ethylenically unsaturated monocarboxylic acid alkyl ester monomer preferably has an alkyl group having 3 to 10 carbon atoms, more preferably has an alkyl group having 3 to 8 carbon atoms, and still more preferably has an alkyl group having 4 to 6 carbon atoms, as the alkyl group.

Specific examples of the α,β-ethylenically unsaturated monocarboxylic acid alkyl ester monomer include acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkylcycloalkyl ester monomers such as ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate, methylcyclohexyl crotonate; and the like.

Further, the α,β-ethylenically unsaturated monocarboxylic acid alkoxyalkyl ester monomer preferably has an alkoxyalkyl group having 2 to 8 carbon atoms, more preferably has an alkoxyalkyl group having 2 to 6 carbon atoms, and still more preferably has an alkoxyalkyl group having 2 to 4 carbon atoms, as the alkoxy alkyl group.

Specific examples of the α,β-ethylenically unsaturated monocarboxylic acid alkoxyalkyl ester monomer include acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, methoxybutyl methacrylate, methoxy-polyethylene glycol (meth)acrylate, methoxy-polyethylene glycol (meth)acrylate; and the like.

Among these α,β-ethylenically unsaturated monocarboxylic acid ester monomers, from the viewpoint of being capable of making the effects of the present invention further remarkable, the acrylic acid alkyl ester monomer and the acrylic acid alkoxyalkyl ester monomer are preferable, n-butyl acrylate and methoxyethyl acrylate are more preferable, and methoxyethyl acrylate is particularly preferable. Further, these α,β-ethylenically unsaturated monocarboxylic acid ester monomers can also be used as two or more types in combination.

The content of the α,β-ethylenically unsaturated monocarboxylic acid ester monomer unit in the nitrile group-containing copolymer rubber of the present invention is preferably 0 to 60 wt %, more preferably 0 to 50 wt %, and still more preferably 0 to 40 wt %, furthermore preferably 8 to 30 wt %. By setting the content of the α,β-ethylenically unsaturated monocarboxylic acid ester monomer unit within the above-mentioned range, it is possible to more suitably increase the cold resistance of the obtained cross-linked rubber.

Further, in addition to the acrylonitrile unit (a), the monomer unit (b) of α,β-ethylenically unsaturated nitrile monomer other than acrylonitrile, and the conjugated diene monomer unit (c), and the carboxyl group-containing monomer unit (d) and the α,β-ethylenically unsaturated monocarboxylic acid ester monomer (e) which are contained accordance with need, the nitrile group-containing copolymer rubber according to the present invention may contain unit of other monomer copolymerizable with monomers forming the above units. Such other monomer includes an α,β-ethylenically unsaturated monocarboxylic acid ester monomer other than those mentioned above, ethylene, an α-olefin monomer, an aromatic vinyl monomer, a fluorine-containing vinyl monomer, a copolymerizable antioxidant, and the like. The α,β-ethylenically unsaturated monocarboxylic acid ester monomer than other those mentioned above includes (meth)acrylic acid esters each having a cyanoalkyl group having 2 to 12 carbon atoms such as α-cyanoethyl acrylate, α-cyanoethyl methacrylate, and cyanobutyl methacrylate; (meth)acrylic acid esters each having a hydroxyalkyl group having 1 to 12 carbon atoms such as 2-hydroxyethyl acrylate, 2-hydroxypropyl acrylate, and 2-hydroxyethyl methacrylate; (meth)acrylic acid esters each having a fluoroalkyl group having 1 to 12 carbon atoms such as trifluoroethyl acrylate and tetrafluoropropyl methacrylate; and the like.

The α-olefin monomer preferably has 3 to 12 carbon atoms, and includes, for example, propylene, 1-butene, 4-methyl-1-pentene, 1-hexene, 1-octene, and the like.

The aromatic vinyl monomer includes styrene, α-methylstyrene, vinylpyridine, and the like.

The fluorine-containing vinyl monomer includes fluoroethyl vinyl ether, fluoropropyl vinyl ether, o-trifluoromethylstyrene, vinyl pentafluorobenzoate, difluoroethylene, tetrafluoroethylene, and the like.

The copolymerizable antiaging agent include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

These copolymerizable other monomers may be used as a plurality of types in combination. The content of the other monomer unit is preferably 50 wt % or less, more preferably 40 wt % or less, and still more preferably 10 wt % or less, with respect to all the monomer units constituting the nitrile group-containing copolymer rubber.

The iodine value of the nitrile group-containing copolymer rubber of the present invention is 120 or less, preferably 80 or less, preferably 50 or less, still more preferably 30 or less, particularly preferably 20 or less, and most preferably 12 or less. When the iodine value of the nitrile group-containing copolymer rubber is too high, heat resistance and ozone resistance of the obtained cross-linked rubber may decrease.

The polymer Mooney viscosity (ML1+4, 100° C.) of the nitrile group-containing copolymer rubber of the present invention is preferably 10 to 200, more preferably 15 to 150, still more preferably 15 to 100, and particularly preferably 30 to 80. By setting the polymer Mooney viscosity of the nitrile group-containing copolymer rubber within the above range, it is possible to further enhance mechanical properties of the obtained cross-linked rubber while keeping processability of the rubber composition good when made into the rubber composition.

The method for producing the nitrile group-containing copolymer rubber of the present invention is not particularly limited, but it is possible to produce it by copolymerizing the above-mentioned and, monomers if necessary, hydrogenating the carbon-carbon double bonds in the obtained copolymer. The polymerization method is not particularly limited, and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials usually used can be used. The emulsifier is not particularly limited, but includes, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzenesulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, and the like. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. The polymerization initiator includes inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, t-butylcumyl peroxide, acetyl peroxide, isobutyryl peroxide, octanoyl peroxide, 3,5,5-trimethylhexanoyl peroxide, dibenzoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or as two or more types in combination. As the polymerization initiator, an inorganic or organic peroxide is preferable. When a peroxide is used as a polymerization initiator, the peroxide can be used in combination with a reducing agent as a redox-type polymerization initiator. The reducing agent is not particularly limited, and examples thereof include compounds which are in a reduced state and contains metal ions such as ferrous sulfate and cuprous naphthenate; sulfinates such as sodium hydroxymethanesulfinate; and sulfites such as sodium sulfite, potassium sodium sulfite, hydrogen sulfite, aldehyde sodium hydrogen sulfite, potassium sulfite; and the like. The amount of addition of the polymerization initiator is preferably 0.01 to 2 parts by weight with respect to 100 parts by weight of the monomers used for the polymerization.

For the medium of emulsion polymerization, usually water is used. The amount of water is preferably 80 to 500 parts by weight, and more preferably 80 to 300 parts by weight with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

Further, for the obtained copolymer, if necessary, the copolymer may be hydrogenated (hydrogenation reaction). The hydrogenation may be performed on the basis of a known method. The known method includes an oil layer hydrogenation method in which the latex of the copolymer obtained by emulsion polymerization is coagulated, and then the hydrogenation is performed in the oil layer; an aqueous layer hydrogenation method in which the latex of the obtained copolymer is hydrogenated as it is; and the like.

When the hydrogenation is performed by the oil layer hydrogenation method, preferably the latex of the copolymer prepared by the emulsion polymerization is coagulated by salting out or by using an alcohol, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the nitrile group-containing copolymer rubber of the present invention can be obtained.

For the coagulation of the latex by salting out, a known coagulant such as sodium chloride, calcium chloride, or aluminum sulfate can be used. Further, instead of the coagulation by salting out, the coagulation may also be performed by using an alcohol such as methanol. The solvent for the oil layer hydrogenation method is not particularly limited so long as the solvent is a liquid organic compound dissolving the copolymer obtained by emulsion polymerization; however, as such a solvent, preferably used chlorobenzene, toluene, xylene, hexane, are benzene, cyclohexane, tetrahydrofuran, methyl ethyl ketone, ethyl acetate, cyclohexanone and acetone.

As the catalyst of the oil layer hydrogenation method, any known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be used as two or more types in combination; however, in such a case, it is preferable to use a palladium-based catalyst as the main active component. These catalysts are usually used as carried on carriers. The carrier includes silica, silica-alumina, alumina, diatomaceous earth, activated carbon, and the like. The amount of use of the catalyst is preferably 10 to 5000 ppm by weight and more preferably 100 to 3000 ppm by weight with respect to the copolymer.

Alternatively, when the hydrogenation is performed by the aqueous layer hydrogenation method, the hydrogenation reaction is performed by adding water to and diluting, if necessary, the latex of the copolymer prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. Specific examples thereof include palladium salts of carboxylic acids such as formic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfatedihydrate, and the like. Among these, the palladium salts of carboxylic acids, dichloro(norbornadiene) palladium, and ammonium hexachloropalladate (IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight with respect to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Then, in the aqueous layer direct hydrogenation method, nitrile group-containing copolymer rubber of the present invention can be obtained by performing coagulation with salting out or performing coagulation with an alcohol, filtration and drying, and the like on the latex after the hydrogenation reaction thus obtained. In this case, the steps of filtration and drying following coagulation may be performed by known methods.

Rubber Composition

The rubber composition of the present invention contains the above-mentioned group-containing copolymer rubber of the present invention and a cross-linking agent.

The cross-linking agent is not particularly limited, but, for example, a sulfur-based cross-linking agent, an organic peroxide cross-linking agent, a polyamine-based cross-linking agent, etc. may be mentioned.

As the sulfur-based cross-linking agent, sulfur such as a powdery sulfur, flower of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N, N'-dithio-bis(hexahydro-2H-azenopine-2), phosphorus-containing polysulfide, and polymeric polysulfide; and sulfur-donating compound such as tetramethyl thiuram disulfide, selenium dimethyl dithiocarbamate, and 2-(4'-morpholinodithio)benzothiazole; etc. may be mentioned. These can be used as single types alone or as a plurality of types combined.

As the organic peroxide crosslinking agent, dicumyl peroxide, cumene hydroperoxide, t-butyl cumyl peroxide, paramenthane hydroperoxide, di-t-butyl peroxide, 1,3-bis(t-butylperoxy isopropyl)benzene, 1,4-bis(t-butylperoxy isopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These can be used as single types alone or as a plurality of types combined.

The polyamine-based cross-linking agent is not particularly limited so long as the polyamine-based cross-linking agent is a compound having two or more amino groups or a compound becoming a form having two or more amino groups at the time of cross-linking, but however, the polyamine-based cross-linking agent is preferably a compound comprised of an aliphatic hydrocarbon or an aromatic hydrocarbon in which a plurality of hydrogen atoms are substituted with amino groups or hydrazide structures (structures each represented by —CONHNH2, where CO represents a carbonyl group) and a compound becoming the form of the aforementioned compound at the time of cross-linking.

As specific examples of the polyamine-based cross-linking agent, aliphatic polyvalent amines such as hexamethylenediamine, hexamethylenediamine carbamate, N, N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis [4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; etc. may be mentioned. Among these, from the viewpoint of being capable of making the effects of the present invention more remarkable, aliphatic polyvalent amines and the aromatic polyvalent amines are preferable, hexamethylenediamine carbamate and 2,2-bis [4-(4-aminophenoxy)phenyl]propane are more preferable, and hexamethylenediamine carbamate is particularly preferable.

The content of the cross-linking agent in the rubber composition of the present invention is not particularly limited, but is preferably 0.1 to 20 parts by weight, more preferably 0.2 to 15 parts by weight, and still more preferably 0.5 to 10 parts by weight, with respect to 100 parts by weight of the nitrile group-containing copolymer rubber. By setting the content of the cross-linking agent within the above-mentioned range, it is possible to make the mechanical properties of the obtained cross-linked rubber better.

Further, the rubber composition of the present invention preferably contains a filler from the viewpoint that the mechanical properties of the obtained cross-linked rubber can be further enhanced. The filler is not particularly limited so long as the filler is any filler usually used in the field of rubber, and any of an organic filler and an inorganic filler can be used, but from the viewpoint of highly effective compounding, the inorganic filler is preferable.

The inorganic filler may be any inorganic filler usually used for compounding in rubber, and, for example, carbon black, silica, clay, alumina, aluminum hydroxide, magnesium oxide, magnesium hydroxide, calcium oxide, calcium hydroxide, magnesium aluminum oxide, titanium oxide, kaolin, pyrophyllite, bentonite, talc, attapulgite, calcium magnesium silicate, aluminum silicate, magnesium silicate, calcium silicate, crystalline aluminosilicate, etc. may be mentioned. Among these, carbon black, silica, and clay are preferably used, silica and clay are more preferable from the viewpoint that the obtained cross-linked rubber can be made more excellent in oil resistance and resistance to hardening in oil under heating environment, and silica is particularly preferred. The inorganic fillers can be used as single types alone or as a plurality of types combined.

Carbon black may be any carbon black usually used for compounding in rubber, and, for example, furnace black, acetylene black, thermal black, channel black, graphite, etc. may be mentioned.

As silica, it is not particularly limited, but natural silica such as quartz powder and silica stone powder; synthetic silica such as silicic anhydride (such as silica gel and aerosil) and hydrous silicic acid; etc. may be mentioned, and among these, synthetic silica is preferable.

Clay is not particularly limited so long as the clay is a natural mineral comprising hydrous aluminum silicate as the main but montmorillonite, pyrophyllite, component, kaolinite, halloysite, sericite, etc. may be mentioned.

As the inorganic filler, the inorganic filler obtained by performing coupling treatment thereon with a silane coupling agent, aluminum coupling agent, titanium coupling agent and the like, or performing surface-modifying treatment thereon with a higher fatty acid or a metal salt thereof, a derivative of the higher fatty acid such as an ester and an amide thereof, a surfactant, and the like may be used. At this time, as the inorganic filler, one that has been subjected to surface-modifying treatment in advance may be used, or when preparing the rubber composition, the surface-modifying treatment of the inorganic filler may be performed by blending a surface modifier such as a coupling treatment agent may be used together with the inorganic filler.

The silane coupling agent is not particularly limited. Examples thereof include sulfur-containing silane coupling agents, such as γ-mercaptopropyltrimethoxysilane, mercaptomethyltrimethoxysilane, mercaptomethyltriethoxysilane, bis(3-triethoxysilylpropyl)tetrasulfane, bis(3-triethoxysilylpropyl)disulfane; epoxy group-containing silane coupling agents, such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, β-glycidoxypropylmethyldiethoxysilane; amino group-containing silane coupling agents, such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, N-phenyl-3-aminopropyltrimethoxysilane; (meth)acryloxy group-containing silane coupling agents, such as γ-methacryloxypropyltrimethoxysilane, γ-methacryloxyloxypropyltris(β-methoxyethoxy) silane, γ-methacryloxypropylmethyldimethoxysilane, γ-methacryloxypropylmethyldiethoxysilane, γ-methacryloxypropyltriethoxysilane, γ-acryloxypropyltrimethoxysilane; vinyl group-containing silane coupling agents, such as vinyltrimethoxysilane, vinyltriethoxysilane, vinyltris(β-methoxyethoxy)silane, vinyltrichlorosilane, vinyltriacetoxysilane; chloropropyl group-containing silane coupling agents, such as 3-chloropropyltrimethoxysilane; isocyanate group-containing silane coupling agents, such as 3-isocyanate propyltriethoxysilane; styryl group-containing silane coupling agents, such as p-styryltrimethoxysilane; ureido group-containing silane coupling agents, as such 3-ureidopropyltriethoxysilane; allyl group-containing silane coupling agents, such as diallyldimethylsilane; alkoxy group-containing silane coupling agents, such as tetraethoxysilane; phenyl group-containing silane coupling agents, such as diphenyldimethoxysilane; fluoro group-containing silane coupling agents, such as trifluoropropyltrimethoxysilane; alkyl group-containing silane coupling agents, such as isobutyltrimethoxysilane, cyclohexylmethyldimethoxysilane; and the like.

Examples of the aluminum-based coupling agents include acetoalkoxyaluminum diisopropylate, aluminum diisopropoxymonoethylacetoacetate, aluminum trisethylacetoacetate, aluminum trisacetylacetonate, and the like.

Examples of the titanate-based coupling agents include isopropyltriisostearoiltitanate, isopropyltris(dioctylpyrophosphate)titanate, isopropyltri(N-aminoethyl-aminoethyl) titanate, tetraoctylbis(ditridecylphosphite)titanate, tetra(2,2-diallyloxymethyl-1-butyl)bis(ditridecyl)phosphitetitanate, bis(dioctylpyrophosphate)oxyacetatetitanate, bis(dioctylpyrophosphate)ethylenetitanate, tetraisopropylbis(dioctylphosphite)titanate, isopropyltriisostearoiltitanate, and the like.

These may be used as single types or a plurality of types in combination.

The content of the inorganic filler in the rubber composition of the present invention is not particularly limited, but is preferably 1 to 200 parts by weight, more preferably 5 to 150 parts by weight, more preferably 10 to 100 parts by weight, and particularly preferably 20 to 50 parts by weight, with respect to 100 parts by weight of the nitrile group-containing copolymer rubber. By setting the content of the inorganic filler within the above range, the obtained cross-linked rubber can be made more excellent in resistance to hardening in oil under heating environment.

Further, the rubber composition of the present invention may include, in addition to the above components, compounding agents usually used in the field of rubber such as a metal oxide such as zinc oxide or magnesium oxide, an α,β-ethylenically unsaturated carboxylic acid metal salt such as zinc methacrylate or zinc acrylate, a plasticizer, a co-cross-linking agent, a cross-linking aid, a cross-linking retarder, an antiaging agent, an antioxidant, a light stabilizer, a scorch retarder such as a primary amine, an activating agent such as diethylene glycol, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

Furthermore, the rubber composition of the present invention may contain rubber other than the above-mentioned nitrile group-containing copolymer rubber of the present invention in a range where the effects of the present invention are not obstructed. Such rubber other than the nitrile group-containing copolymer rubber of the present invention includes acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, and polyisoprene rubber, and the like. When mixing in rubber other than the nitrile group-containing copolymer rubber of the present invention, the amount is preferably 30 parts by weight or less, more preferably 20 parts by weight or less, still more preferably 10 parts by weight or less, with respect to 100 parts by weight of the nitrile group-containing copolymer rubber of the present invention.

The rubber composition of the present invention is prepared by mixing the above ingredients preferably in a nonaqueous system. The method of preparation of the rubber composition of the present invention are not particularly limited, but usually it can be prepared by kneading the ingredients other than the cross-linking agent and ingredients unstable against heat (co-cross-linking agents and the like) by a mixing machine such as a Banbury mixer, internal mixer, or kneader for primary kneading, then transferring the mixture to open rolls and the like and adding the cross-linking agent and ingredients unstable against heat and the like for secondary kneading.

Cross-Linked Rubber

The cross-linked rubber of the present invention is obtained by cross-linking the above cross-linkable nitrile rubber composition of the present invention.

The cross-linked rubber of the present invention can be produced as follows: the cross-linkable nitrile rubber composition of the present invention is used, the composition is formed by using a forming machine corresponding to the desired shape, such as an extruder, an injection molding machine, a compressor, or a roll, the cross-linking reaction is performed by heating the formed product, and thus the shape of the formed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, and the like of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

Preferably, the rubber composition is used within the body 2 of the power transmission belt, but it can be used also in any other portion of the power transmission belt as for example in the fabric treatment composition, in the compound forming the teeth, in a further compound forming only the back of the power transmission belt and not the full body or in the cord treatment.

Preferably, the body or also any further elastomeric mixture within the power transmission belt is made of a compound comprising one elastomeric material as the main elastomer, optionally in combination with further elastomeric materials and additives.

The "main elastomer" is intended as being present in the compound that constitutes the body for more than 50% by weight, calculated on the total weight of all the elastomers in the compound and therefore excluding all other non-elastomeric components of the power transmission belt.

Preferably, the invention elastomer is the main elastomer.

The body of the power transmission belt may advantageously comprise one or more further elastomers that is chosen from the group constituted by rubber (NR), natural polychloroprene (CR), acrylonitrile butadiene (NBR) and associated hydrogenated elastomers known as hydrogenated acrylonitrile butadiene (HNBR) or zinc salts of hydrogenated acrylonitrile butadiene seamed with esters of unsaturated carboxylic acid, polyisoprene, styrene-butadiene rubbers, ethylene-alpha-olefin elastomers, EPDM, polyurethane, fluoroelastomers, ethylene-acrylic elastomers (AEM), bromobutyls, chlorosulphonated polythene (CSM) or chlorosulphonated alkyl, chlorinated polythene, epoxidized natural rubber, SBR, NBR carboxylates, HNBR carboxylates, ACM and mixtures of these compounds.

Mixed compounds of polyolefin and rubber containing acrylonitrile units are also preferred, more preferably compounds containing a copolymer of ethylene the rubber copolymer according to the invention. For example, rubbers containing EPDM (ethylene-propylene diene monomer) or EPM (ethylene-propylene monomer) are advantageously added to the copolymers of the present invention, in quantities preferably in the range between 1% and 30%.

In addition to the elastomeric materials, the body compound can comprise conventional additives such as, for example, reinforcement agents, extenders, pigments, stearic acid, accelerators, vulcanization agents, antioxidants, activators, initiators, plasticizers, waxes, pre-vulcanization inhibitors, anti-degradants, process oils and similar.

The skilled person may vary the quantity of the various additives according to the specific needs.

Advantageously, carbon black can be employed as a filler, being advantageously added in quantities in the range between 0 and 80 phr, more advantageously about 40 phr.

Advantageously, light-coloured reinforcing filers such as talc, calcium carbonate, silica and silicates are added in quantities advantageously in the range between 0 and 80 phr, advantageously about 40 phr. It is also possible to advantageously use silanes in quantities in the range between 0 and 5 phr.

Advantageously, zinc and magnesium oxides are added in a quantity ranging between 0 and 15 phr.

Advantageously, ester plasticizers such as trimellitates or ethyl esters or ethylene glycol ether esters (e.g. ADK sizer 700 or ADK sizer 735) are added in a quantity advantageously ranging between 0 and 20 phr.

Advantageously, pre-vulcanization coagents such as triallyl cyanurates and organic or inorganic methacrylates such as metal salts are advantageously added in a quantity ranging between 0 and 20 phr, or organic peroxides, such as isopropyl benzene peroxide for example, in a quantity advantageously ranging between 0 and 15 phr.

Advantageously, the mixture in the elastomeric material moreover comprises reinforcement fibres, more advantageously in an amount comprised between 2 and 40 phr, even more advantageously 20 phr. Advantageously, the reinforcement fibres have a length comprised between 0.1 and 10 mm.

The use of fibres enables a further increase in the mechanical characteristics of the mixture constituting the body.

Advantageously, the reinforcement fibres comprise aromatic polyamides, more advantageously aramides, for example Technora® fibres can be advantageously used, which can be adhered to the mixture by means of an RFL-based treatment. For example, the lattice used can have a base of VP-SBR, i.e., a copolymer of vinylpiridine and styrenebutadiene.

Particularly effective have proven aramidic fibres, such as, for example, Technora® fibres of Teijn having a length of 1 mm.

Preferably, the power transmission belt is a toothed power transmission belt.

Preferably, the pitch of the toothed belts is between 5 and 10 mm, more preferably between 8 and 10 mm.

A power transmission belt according to the present invention is made by using the known manufacturing processes.

The manufacturing process for the power transmission belt comprises a step during which the compound loaded with fibres is passed through a calender so as to form a strip of material in which the fibres are arranged in the direction of calendering. The compound is then collected on a roller.

The power transmission belts of the present invention are particularly indicated for use in vehicle transmission systems.

More preferably, the power transmission belts according to the present invention are also suitable for being used in transmission systems in which, in use, they are in direct contact with or partially immersed in oil.

In particular, excellent results have been achieved in the case where the power transmission belt is used as a replacement for traditional gear or chain systems inside the crankcase, systems in which the power transmission belt is exposed for its entire working life to means that continuously place it in contact with oil or, if necessary, is partially immersed in an oil bath.

In particular, the power transmission belt of the present invention has proved to be particularly effective when used in a transmission system commonly known as balance shaft.

In use, the power transmission belts in the respective control systems are in direct contact with oil.

Alternatively, the power transmission belts according to the present invention can also be used as dry timing belts.

Furthermore, it is also possible to use the power transmission belt of the present invention in the main transmission for driving cams and also for driving the injection pump in diesel engines.

From an examination of the characteristics of the power transmission belt produced according to the present invention, the advantages that can be achieved with it are evident.

It has been experimentally verified that the use of the power transmission belt comprising the cross linked rubber according to the present invention ensures a significant improvement in low-temperature characteristics whilst maintaining an high temperature resistance, and the same or lower swell in oil as compared to known power transmission belts.

In this way, the power transmission belts according to the invention assures that the power transmission belt does not need to be replaced for the entire working life of the vehicle.

It has also been verified that the power transmission belts according to the present invention also allow achieving effective oil resistance even at high temperatures and consequently pass the durability tests to which power transmission belts are subjected in order to be used in motor vehicles and therefore avoid all the power transmission belt problems when used continuously in contact with oil and, in particular, the fall-off in mechanical characteristics, less adhesion, worse meshing and less wear resistance. In particular, since the cross-linked rubber of the present invention is excellent in resistance to hardening in oil under heating environment (specifically, being small in a change in glass transition temperature and a change in hardness when immersed in an oil containing a polycyclic condensed aromatic compound after being stored in a heating environment), it can be suitably used for applications in which the cross-linked rubber is used in contact with a fuel oil containing a condensed polycyclic aromatic compound under high temperature environment.

Furthermore, it has also been verified that the power transmission belts of the present invention can be used as dry power transmission belts in high-operating temperature timing systems, where high operating temperature is intended as a temperature greater than 130° C.

Furthermore, the power transmission belts according to the present invention have a very low swelling, in particular in the use in fuel-mixed oil.

While some embodiments have been disclosed by way of illustration of the invention, it is apparent that the skilled in the art may make modifications to the kind of fibres and to the materials forming it, as well as to the materials of the body compound and of the other components of the power transmission belt without departing from the scope of the present invention.

In what follows, unless otherwise specified, "parts" are parts by weight. The methods of testing or evaluating the physical properties and the characteristics are as follows. The contents of the respective monomer units constituting a nitrile group-containing copolymer rubber were measured by the following method.

Specifically, the content of the methacrylic acid unit was calculated as follows. To 0.2 g of a 2 mm square piece of the nitrile group-containing copolymer rubber, 100 mL of 2-butanone was added. The mixture was stirred for 16 hours, and then 20 mL of ethanol and 10 ml of water were added to the mixture. While stirring, a titration was performed at room temperature by using a 0.02 N hydrous ethanol solution of potassium hydroxide, and thymolphthalein as an indicator, and thus the number of moles of the carboxyl group with respect to 100 g of the nitrile group-containing copolymer rubber was determined. Then, the determined number of moles was converted into the content of the methacrylic acid unit. The content of the diene, e.g. 1,3-butadiene unit and the content of the saturated butadiene unit were calculated by measuring the iodine values before and after hydrogenation reaction (in accordance with JIS K 6235:2006) using the nitrile group-containing copolymer rubber.

The content of the methacrylonitrile unit and the acrylonitrile unit were calculated by measuring the nitrogen content in the nitrile group-containing copolymer rubber using the Dumas method according to JIS K6451-1:2016 and identify the methacrylonitrile unit and the acrylonitrile unit by pyrolysis gas chromatography, respectively.

The content of the 2-methoxyethyl acrylate unit was determined by calculation from the contents of the methacrylic acid unit, the 1,3-butadiene unit, the saturated butadiene unit, the methacrylonitrile unit and the acrylonitrile unit each determined as described above.

An iodine value of the nitrile group-containing copolymer rubber was measured according to JIS K 6235:2006.

A Mooney viscosity of the nitrile group-containing copolymer rubber (polymer Mooney) was measured according to JIS K6300:2013 (unit is [ML1+4, 100° C.]).

To measure the Normal physical properties (tensile strength, elongation, and hardness) aA rubber composition was placed in a mold of 15 cm in length, 15 cm in width and 0.2 cm in depth, and was press-formed at 170° C. for 20 minutes while being pressurized at a press pressure of 10 MPa, and thus a sheet-shaped cross-linked rubber was obtained. Then, the obtained cross-linked rubber was transferred to a geer oven and subjected to a secondary cross-linking at 170° C. for 4 hours to obtain a sheet-shaped cross-linked rubber, and the obtained sheet-shaped cross-linked rubber was punched with a JIS No. 3 dumbbell to prepare a test piece. Then, by using the obtained test piece, the tensile strength and the elongation at break of the cross-linked rubber were measured in accordance with JIS K6251:2017, and, further, the hardness of the cross-linked rubber was measured by using a durometer hardness tester (type A) in accordance with JIS K6253:2012. The Heat resistance test is made using a sheet-shaped cross-linked rubber obtained in the same manner as in the evaluation of the above normal physical properties, a heat resistance test was performed according to JIS K6257:2017. Specifically, after the obtained sheet-shaped cross-linked rubber was held in a geer oven under the conditions of a temperature of 150° C. and 504 hours, the tensile strength and the elongation at break were measured in the same manner as the above-mentioned normal physical properties, and the change rate in the tensile strength and elongation after the heat resistance test were obtained. The larger the value of the change rate in the tensile strength and the larger the elongation after the heat resistance test, it can be judged that it is excellent in heat resistance. The change rate in the tensile strength was calculated according to the following formula.

Change rate in tensile strength (%)={("tensile strength after heat resistance test"−"tensile strength before heat resistance test")/"tensile strength before heat resistance test"}×100.

Oil resistance test (IRM903) is done using a sheet-shaped cross-linked rubber obtained in the same manner as in the evaluation of the above normal physical properties, according to JIS K6258:2016, an oil resistance test was performed by immersing the obtained sheet-shaped cross-linked rubber in a test lubricating oil No. 3 oil (trade name "IRM903", manufactured by Japan Sun Oil Co., Ltd.) under conditions of a temperature of 150° C. and 504 hours. Then, the volume of the cross-linked rubber before and after immersion in the test lubricating oil was measured, the volume change rate after the oil resistance test was calculated, and the elongation at break was measured in the same manner as the above-mentioned normal physical properties to determine the elongation after the oil resistance test. The smaller the volume change rate after the oil resistance test and the larger the elongation after the oil resistance test, it can be judged that it is excellent in oil resistance. The volume change rate after the oil resistance test was calculated according to the following formula.

Volume change rate after oil resistance test (%)={("volume after oil resistance test"−"volume before oil resistance test")/"volume before oil resistance test"}×100

The Fuel oil resistance test is made using a sheet-shaped cross-linked rubber obtained in the same manner as in the evaluation of the above normal physical properties, a fuel oil resistance test was performed by immersing the obtained sheet-shaped cross-linked rubber in a test fuel oil (Fuel B:ethanol=74:26 (volume ratio) (Fuel B is a mixture of isooctane:toluene=70:30 (volume ratio)) which was adjusted to 150° C. for 168 hours according to JIS K6258:2016. Then, using the cross-linked rubber which had been subjected to fuel oil resistance test, the tensile strength and the elongation at break were measured in the same manner as the above-mentioned normal physical properties to determine the change rate in the tensile strength and the elongation after the fuel oil resistance test. The larger the value of the change rate in the tensile strength, and the larger the elongation after the fuel oil resistance test, it can be determined to be excellent in oil resistance (fuel oil resistance). The change rate in the tensile strength was calculated according to the following formula.

Change rate in tensile strength (%)={("tensile strength after fuel oil resistance test"−"tensile strength before fuel oil resistance test")/"tensile strength before fuel oil resistance test"}×100

Test of Resistance to Hardening in Oil Under Heating Environment (Change in Glass Transition Temperature and Change in Hardness when Immersed in Fuel Oil Containing Polycyclic Condensed Aromatic Compound)

A phenanthrene-containing test fuel oil was prepared by dissolving 10 wt % of phenanthrene in a mixed liquid of Fuel C (a mixture of isooctane:toluene=50:50 (volume ratio)) and ethanol (Fuel C:ethanol=80:20 (volume ratio)). Also, using a sheet-shaped cross-linked rubber obtained in the same manner as in the evaluation of the above normal physical properties, measurement of the glass transition temperature was performed. The glass transition temperature was measured by using a heat flux type differential scanning calorimeter (device: manufactured by SII Nanotechnology Inc., X-DSC7000) according to JIS K7121:2012 at a heating rate of 20° C./min. Then, the sheet-shaped cross-linked rubber was heated by holding it in a geer oven at a temperature of 150° C. for 504 hours in accordance with JIS K6257:2017, and then the cross-linked rubber after heating was immersed in the phenanthrene-containing test fuel oil prepared above at 60° C. for 70 hours. Then, the cross-linked rubber was taken out from the phenanthrene-containing test fuel oil, dried at 120° C. for 3 hours, and allowed to stand under room temperature conditions for 24 hours. Then, the glass transition temperature was measured in the same manner as described above, and the hardness was measured in the same manner as the above normal physical properties, and the change in the glass transition temperature and the change of the hardness were determined in accordance with the following formulas, respectively. The smaller the change in the glass transition temperature and the smaller the change of the hardness, it can be judged that the better it is excellent in resistance to hardening in oil under heating environment.

Change in glass transition temperature (° C.)="glass transition temperature after test of resistance to hardening in oil"−"glass transition temperature before test of resistance to hardening in oil"

Change in hardness="hardness after test of resistance to hardening in oil"−"hardness before test of resistance to hardening in oil"

Example 1

In a metallic bottle, 180 parts of ion exchanged water, 25 parts of aqueous an solution of sodium dodecylbenzenesulfonate having a concentration of 10 wt %, 7 parts of methacrylonitrile, 21 parts of acrylonitrile, 30 parts of 2-methoxyethyl acrylate, 2 parts of methacrylic acid, and 0.5 part of t-dodecyl mercaptan (molecular weight adjuster) were added in the mentioned order, the gas inside the metallic bottle was replaced with nitrogen three times, and then 40 parts of 1,3-butadiene was placed in the metallic bottle. The metallic bottle was held at 5° C., 0.1 part of cumene hydroperoxide (polymerization initiator), and appropriate amounts of reducing agent and chelating agent were placed in the metallic bottle, and the polymerization reaction was performed for 16 hours while the metallic bottle was being rotated. After 0.1 parts of an aqueous solution of hydroquinone (polymerization terminator) a having concentration of 1 wt % was added to terminate the polymerization reaction, the residual monomers were removed by using a rotary evaporator at a water temperature of 60° C., to obtain a latex of a copolymer rubber (solid content concentration of about 30 wt %).

Then, in an autoclave, the latex of the copolymer rubber obtained as described above and a palladium catalyst (a solution prepared by mixing 1 wt % palladium chloride aqueous solution and an equal weight of ion exchanged water) were added in such a way that the content of palladium was 3,500 ppm by weight with respect to the dry weight of the copolymer rubber contained in the latex of the copolymer rubber, then, a hydrogenation reaction was performed at a hydrogen pressure of 3.0 MPa and a temperature of 50° C. for 7 hours to obtain a latex of a nitrile group-containing copolymer rubber (A-1).

Next, to the obtained latex, two times volume of methanol was added to coagulate the latex, and then the resulting mixture was vacuum dried at 60° C. for 12 hours to thereby obtain the nitrile group-containing copolymer rubber (A-1). Regarding the compositions of the respective monomer units, the obtained nitrile group-containing copolymer rubber (A-1) included 8 wt % of methacrylonitrile unit, 21 wt % of acrylonitrile unit, 22 wt % of 2-methoxyethyl acrylate unit, 2.1 wt % of methacrylic acid unit, and 46.9 wt % of 1,3-butadiene unit (including hydrogenated moieties). Further, the obtained nitrile group-containing highly rubber (A-1) had an iodine value of 8, and a polymer Mooney viscosity [ML1+4, 100° C.] of 60.

Then, to 100 parts of the obtained nitrile group-containing copolymer rubber (A-1), 30 parts of silica (trade name "Carplex 1120", manufactured by Evonik Industries), 5 parts of tris(2-ethylhexyl) trimellitate (trade name "ADK CIZER C-8", manufactured by ADEKA Corporation, plasticizer), 1 part of polyoxyethylene alkyl ether phosphate ester (trade name "Phosphanol RL210", manufactured by Toho Chemical Industry Co., Ltd.), 1 part of Stearic Acid, 1.5 parts of 4,4'-di-(α,α-dimethylbenzyl) diphenylamine (trade name "Nocrac CD", manufactured by Ouchi Shinko Chemical Industry Co., Ltd., antiaging agent), 1.5 parts of a zinc salt of 2-mercaptobenzimidazole (trade name "Nocrac MBZ", manufactured by Ouchi Shinko Chemical Industry Co., Ltd., antiaging agent), 1.5 parts of a silane coupling agent (trade name "Silanogran HVS", manufactured by Kettlitz-Chemie GmbH), and 7 parts of zinc diacrylate (trade name "Dymalink 633", manufactured by Cray Valley) were blended and mixed for 5 minutes at 50° C. Then, the obtained mixture was transferred to a roll of 50° C., and 10 parts of 1,3-bis(t-butylperoxyisopropyl)benzene (trade name "Vulcup 40KE", manufactured by Hercules, organic peroxide cross-linking agent, 40% product) was blended and the rubber composition was obtained.

Then, using the obtained rubber composition, measurement of normal physical properties (tensile strength, elongation, hardness), heat resistance test, oil resistance test (IRM903), fuel oil resistance test, and test of resistance to hardening in oil under heating environment were performed according to the above method. The results were shown in Table 1.

Examples 2 to 4

Except that the amounts of methacrylnitrile, acrylonitrile, 2-methoxyethyl acrylate, methacrylic acid, and 1,3-butadiene were changed as shown in Table 1, nitrile group-containing copolymer rubbers (A-2), (A-3) and (A-4) were obtained as in Example 1, and rubber compositions were prepared in the same manner and evaluated in the same manner. The results were shown in Table 1. The monomer composition, iodine value and polymer Mooney viscosity [ML1+4, 100° C.] of each the nitrile group-containing copolymer rubbers (A-2), (A-3) and (A-4) were as shown in Table 1.

Examples 5 to 7

Except that the amounts of methacrylnitrile, acrylonitrile, methacrylic acid, and 1,3-butadiene were changed as shown in Table 1, and 2-methoxyethyl acrylate was not used, a nitrile group-containing copolymer rubbers (A-5), (A-6) and (A-7) were obtained as in Example 1, and rubber compositions were prepared in the same manner and evaluated in the same manner. The results were shown in Table 1. The monomer composition, iodine value and polymer Mooney viscosity [ML1+4, 100° C.] of the nitrile group-containing copolymer rubber (A-5), (A-6), (A-7) were as shown in Table 1.

Example 8

Except that the amounts of methacrylnitrile, acrylonitrile, and 1,3-butadiene were changed as shown in Table 1, and methacrylic acid and 2-methoxyethyl acrylate were not used, a nitrile group-containing copolymer rubber (A-8) was obtained as in Example 1, and a rubber composition was prepared in the same manner and evaluated in the same manner. The results were shown in Table 1. The monomer composition, iodine value and polymer Mooney viscosity [ML1+4, 100° C.] of the nitrile group-containing copolymer rubber (A-6) were as shown in Table 1.

Comparative Example 1

Except that the amounts of methacrylnitrile, 2-methoxyethyl acrylate, methacrylic acid and 1,3-butadiene were changed as shown in Table 1, and acrylonitrile was not used, a nitrile group-containing copolymer rubber (A'-9) was obtained as in Example 1, and a rubber composition was prepared in the same manner and evaluated in the same manner. The results were shown in Table 1. The monomer composition, iodine value and polymer Mooney viscosity [ML1+4, 100° C.] of the nitrile group-containing copolymer rubber (A'-7) were as shown in Table 1.

Comparative Example 2

Except that the amounts of acrylonitrile, 2-methoxyethyl acrylate, methacrylic acid and 1,3-butadiene were changed as shown in Table 1, and methacrylnitrile was not used, a nitrile group-containing copolymer rubber (A'-10) was obtained as in Example 1, and a rubber composition was prepared in the same manner and evaluated in the same manner. The results were shown in Table 1. The monomer composition, iodine value and polymer Mooney viscosity [ML1+4, 100° C.] of the nitrile group-containing copolymer rubber (A'-10) were as shown in Table 1.

Comparative Examples 3, 4

Except that the amounts of methacrylnitrile, acrylonitrile, 2-methoxyethyl acrylate, methacrylic acid, and 1,3-butadiene were changed as shown in Table 1, nitrile group-containing copolymer rubbers (A'-11) and (A'-12) were obtained as in Example 1, and rubber compositions were prepared in the same manner and evaluated in the same manner. The results were shown in Table 1. The monomer composition, iodine value and polymer Mooney viscosity [ML1+4, 100° C.] of each the nitrile group-containing copolymer rubbers (A'-11) and (A'-12) were as shown in Table 1.

Comparative Example 5

Except that the amounts of acrylonitrile and 1,3-butadiene were changed as shown in Table 1, and 2-methoxyethyl acrylate, methacrylnitrile and methacrylic acid were not used, a nitrile group-containing copolymer rubber (A'-13) was obtained as in Example 1, and a rubber composition was prepared in the same manner and evaluated in the same manner. The results were shown in Table 1. The monomer composition, iodine value and polymer Mooney viscosity [ML1+4, 100° C.] of the nitrile group-containing copolymer rubber (A'-13) were as shown in Table 1.

As shown in Table 1, according to the nitrile group-containing copolymer rubber comprising an acrylonitrile unit (a), a monomer unit (b) of α,β-ethylenically unsaturated nitrile monomer other than acrylonitrile, and a conjugated diene monomer unit (c) and having an iodine value of 120 or less and having a content ratio of the acrylonitrile unit (a) and the monomer unit (b) of α,β-ethylenically unsaturated nitrile monomer other than acrylonitrile in a specific range, the cross-linked rubber obtained using the same has good normal physical properties and excellent heat resistance, and exhibits excellent oil resistance in both cases when the test lubricating oil IRM903 was used and when the fuel oil was used, and it was excellent in resistance to hardening in oil under heating environment (specifically, being small in a change in glass transition temperature and a change in hardness when immersed in an oil containing a polycyclic condensed aromatic compound) (Examples 1 to 8).

On the other hand, in case of the nitrile group-containing copolymer rubber which does not contain an acrylonitrile unit (a), the cross-linked rubber obtained using the same has low tensile strength in normal state, and also has a large volume change rate when immersed in the test lubricating oil IRM903, not sufficient oil resistance, and further has a large hardness change when immersed in an oil containing a polycyclic condensed aromatic compound after being stored in a heating environment, and is inferior in resistance to hardening in oil under heating environment (Comparative Example 1).

Further, in case of the nitrile group-containing copolymer rubber which does not contain a monomer unit (b) of α,β-ethylenically unsaturated nitrile monomer other than acrylonitrile or in case of the nitrile group-containing copolymer rubber where the amount of a monomer unit (b) of α,β-ethylenically unsaturated nitrile monomer other than acrylonitrile is too small, the cross-linked rubber obtained using the same has a particularly large change in glass transition temperature and a particularly large hardness change when immersed in an oil containing a polycyclic condensed aromatic compound after being stored under a heating environment, and is particularly inferior in resistance to hardening in oil under heating environment (Comparative Examples 2, 4 and 5).

In case of the nitrile group-containing copolymer rubber where the amount of an acrylonitrile unit (a) is too small, the cross-linked rubber obtained using the same has low tensile strength in normal state, and also has a large volume change rate when immersed in the test lubricating oil IRM903, not sufficient oil resistance (Comparative Example 3).

The invention claimed is:

1. A power transmission belt comprising:
   a nitrile group-containing copolymer rubber comprising an acrylonitrile unit (a), a monomer unit (b) of α,β-ethylenically unsaturated nitrile monomer other than acrylonitrile, and a conjugated diene monomer unit (c) and having an iodine value of 120 or less, with the proviso that the conjugated diene monomer unit (c) does not include isoprene;
   wherein a content of the total of the acrylonitrile unit (a) and the monomer unit (b) of α,β-ethylenically unsaturated nitrile monomer other than acrylonitrile is 1 to 50% by weight in the total monomer unit, and a content ratio of the acrylonitrile unit (a) and the monomer unit (b) of α,β-ethylenically unsaturated nitrile monomer other than acrylonitrile is 10:90 to 90:10 in a weight ratio of "content of acrylonitrile unit (a):content of monomer unit (b) of α,β-ethylenically unsaturated nitrile monomer other than acrylonitrile".

2. The power transmission belt according to claim 1, wherein the α,β-ethylenically unsaturated nitrile units (b) other than acrylonitrile constituting the monomer unit (b) of α,β-ethylenically unsaturated nitrile monomer other than acrylonitrile has 2 to 5 carbon atoms as the carbon atom excluding the cyano group.

3. The power transmission belt according to claim 1, wherein the content of acrylonitrile unit a) and the monomer unit b) of α,β-ethylenically unsaturated nitrile monomer other than acrylonitrile is 10 to 45% wt in the total monomer unit.

4. The power transmission belt according to claim 1, wherein the iodine value of the nitrile group-containing copolymer rubber is 80 or less.

5. The power transmission belt according to claim 1, wherein the content ratio of the acrylonitrile unit (a) and the monomer unit (b) of α,β-ethylenically unsaturated nitrile monomer other than acrylonitrile is 20:80 to 80:20 in a weight ratio of "content of acrylonitrile unit (a):content of monomer unit (b) of α,β3-ethylenically unsaturated nitrile monomer other than acrylonitrile".

6. The power transmission belt according to claim 1, wherein the content ratio of the acrylonitrile unit (a) in the nitrile group-containing copolymer rubber is 1 to 45 wt % based on the total monomer unit.

7. The power transmission belt according to claim 1, wherein the content of the monomer unit (b) of α,β-ethylenically unsaturated nitrile monomer other than acrylonitrile in the nitrile group-containing copolymer rubber is 1 to 45 wt % based on the total monomer unit.

8. The power transmission belt according to claim 1, wherein the conjugated diene monomer have 4 to 6 carbon atoms selected from the group consisting of 1,3-butadiene, isoprene, 2,3-dimethyl-1,3-butadiene, 1,3-pentadiene, chloroprene and combinations thereof.

9. The power transmission belt according to claim 1, wherein the content of the conjugated diene monomer unit (c) is 10 to 90 wt % based on the total monomer unit.

10. The power transmission belt according to claim 1, wherein said material is loaded with fibres in a quantity of between 1% and 50% by weight of the total non-elastomeric material.

11. The power transmission belt according to claim 1, wherein it is a toothed power transmission belt.

12. The power transmission belt according to claim 1, wherein the nitrile group-containing copolymer rubber is blended with a cross linking agent and a resulting cross-linked rubber is present in the belt.

13. The power transmission belt according to claim 1, wherein the iodine value of the nitrile group-containing copolymer rubber is 30 or less.

14. The power transmission belt according to claim 1, wherein the iodine value of the nitrile group-containing copolymer rubber is 12 or less.

15. The power transmission belt according to claim 1, wherein the content ratio of the acrylonitrile unit (a) and the monomer unit (b) of α,β-ethylenically unsaturated nitrile monomer other than acrylonitrile is 30:70 to 70:30 in a weight ratio.

16. The power transmission belt according to claim 1, wherein the content ratio of the acrylonitrile unit (a) in the nitrile group-containing copolymer rubber is 10 to 37.5 wt % based on the total monomer unit.

17. The power transmission belt according to claim 1, wherein the content ratio of the acrylonitrile unit (a) in the nitrile group-containing copolymer rubber is 12 to 25 wt % based on the total monomer unit.

18. The power transmission belt according to claim 1, wherein the content of the monomer unit (b) of α,β-ethylenically unsaturated nitrile monomer other than acrylonitrile in the nitrile group-containing copolymer rubber is 10 to 37.5 wt % based on the total monomer unit.

19. The power transmission belt according to claim 1, wherein the content of the monomer unit (b) of α,β-ethylenically unsaturated nitrile monomer other than acrylonitrile in the nitrile group-containing copolymer rubber is 12 to 25 wt % based on the total monomer unit.

20. The power transmission belt according to claim 1, wherein the content of the conjugated diene monomer unit (c) is 35 to 65 wt % based on the total monomer unit.

* * * * *